(12) United States Patent
Yochai et al.

(10) Patent No.: US 8,769,197 B2
(45) Date of Patent: *Jul. 1, 2014

(54) GRID STORAGE SYSTEM AND METHOD OF OPERATING THEREOF

(71) Applicant: Infinidat Ltd., Hertzella (IL)

(72) Inventors: Yechiel Yochai, D.N. Menashe (IL); Leo Corry, Ramat Gan (IL); Haim Kopylovitz, Herzliya (IL)

(73) Assignee: Infinidat Ltd., Hertzelia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,538

(22) Filed: Jun. 5, 2013

(65) Prior Publication Data

US 2013/0268730 A1 Oct. 10, 2013

Related U.S. Application Data

(63) Continuation of application No. 12/704,317, filed on Feb. 11, 2010, now Pat. No. 8,495,291, which is a continuation-in-part of application No. 12/544,743, filed on Aug. 20, 2009.

(60) Provisional application No. 61/189,755, filed on Aug. 21, 2008, provisional application No. 61/151,528, filed on Feb. 11, 2009, provisional application No. 61/151,533, filed on Feb. 11, 2009.

(51) Int. Cl.
*G06F 12/00* (2006.01)
*G06F 12/08* (2006.01)
*G06F 11/14* (2006.01)

(52) U.S. Cl.
CPC ........ *G06F 12/0868* (2013.01); *G06F 11/1464* (2013.01)

USPC .... 711/113; 711/112; 711/162; 711/E12.019; 714/6.2; 714/6.3

(58) Field of Classification Search
CPC .. G06F 12/0868; G06F 3/0658; G06F 3/0689
See application file for complete search history.

(56) References Cited

U.S. PATENT DOCUMENTS

| | | |
|---|---|---|
| 7,188,225 B1 | 3/2007 | Therene et al. |
| 7,237,062 B2 | 6/2007 | Lubbers et al. |
| 7,406,621 B2 | 7/2008 | Lubbers et al. |
| 7,474,926 B1 | 1/2009 | Carr et al. |
| 2002/0194523 A1 | 12/2002 | Ulrich et al. |
| 2004/0049638 A1 | 3/2004 | Ashmore et al. |
| 2005/0066100 A1 | 3/2005 | Elliott et al. |

(Continued)

*Primary Examiner* — Reginald Bragdon
*Assistant Examiner* — Thanh D Vo
(74) *Attorney, Agent, or Firm* — Oren Reches

(57) ABSTRACT

A method of operating a storage system includes: configuring the address space so that each LBA is assigned to at least two servers among a plurality of at least three servers in a control grid: to a primary server with a primary responsibility for handling requests corresponding to said LBA, and to a secondary server with a secondary responsibility for handling requests corresponding to said LBA. In response to a request corresponding to a certain LBA range, generating by a data server having primary responsibility over the certain LBA range, a primary cache object; identifying a data server configured as a secondary data server with regard to the certain LBA range; and generating a redundancy cache object corresponding to the primary cache object only at the identified secondary data server, the redundancy cache object to be used by the identified secondary data server when taking the primary responsibility.

16 Claims, 11 Drawing Sheets

(56) References Cited

U.S. PATENT DOCUMENTS

| | | |
|---|---|---|
| 2005/0071549 A1* | 3/2005 | Tross et al. .............. 711/113 |
| 2006/0085594 A1 | 4/2006 | Roberson et al. |
| 2006/0143407 A1 | 6/2006 | Humlicek |
| 2006/0184565 A1 | 8/2006 | Nishikawa et al. |
| 2006/0212644 A1 | 9/2006 | Acton et al. |
| 2007/0101186 A1 | 5/2007 | Chen |
| 2008/0005614 A1 | 1/2008 | Lubbers et al. |
| 2008/0104359 A1 | 5/2008 | Sauer et al. |
| 2008/0126696 A1 | 5/2008 | Holland et al. |
| 2008/0189484 A1 | 8/2008 | Iida et al. |
| 2008/0208927 A1 | 8/2008 | Chikusa et al. |
| 2008/0270694 A1 | 10/2008 | Patterson et al. |
| 2008/0276040 A1 | 11/2008 | Moritoki |
| 2009/0077099 A1 | 3/2009 | Haustein et al. |
| 2009/0077312 A1 | 3/2009 | Miura |
| 2009/0132760 A1 | 5/2009 | Flynn et al. |
| 2010/0023715 A1 | 1/2010 | Jibbe et al. |

* cited by examiner

GRID STORAGE SYSTEM AND METHOD OF OPERATING THEREOF

CROSS-REFERENCES TO RELATED APPLICATIONS

The present application is a continuation of U.S. patent application Ser. No. 12/704,317 filed Feb. 11, 2010. U.S. patent application Ser. No. 12/704,317 is a continuation-in-part of U.S. patent application Ser. No. 12/544,743 filed Aug. 20, 2009 and claiming benefit from U.S. Provisional Patent Applications No. 61/189,755, filed on Aug. 21, 2008 and 61/151,528 filed Feb. 11, 2009; U.S. patent application Ser. No. 12/704,317 further claims benefit from U.S. Provisional Patent Application No. 61/151,533 filed Feb. 11, 2009. The entire contents of these applications are hereby incorporated by reference in their entirety.

FIELD OF THE INVENTION

The present invention relates, in general, to data storage systems and respective methods for data storage, and, more particularly, to virtualized grid storage systems.

BACKGROUND OF THE INVENTION

Modern enterprises are investing significant resources to preserve and provide access to data. Data protection is a growing concern for businesses of all sizes. Users are looking for a solution that will help to verify that critical data elements are protected, and storage configuration can enable data integrity and provide a reliable and safe switch to redundant computing resources in case of an unexpected disaster or service disruption.

To accomplish this, storage systems may be designed as fault tolerant systems spreading data redundantly across a set of storage-nodes and enabling continuous operation when a hardware failure occurs. Fault tolerant data storage systems may store data across a plurality of disk drives and may include duplicate data, parity or other information that may be employed to reconstruct data if a drive fails. Data storage formats, such as RAID (Redundant Array of Independent Discs), may be employed to protect data from internal component failures by making copies of data and rebuilding lost or damaged data. As the likelihood for two concurrent failures increases with the growth of disk array sizes and increasing disk densities, data protection may be implemented, for example, with the RAID 6 data protection scheme well known in the art.

Common to all RAID 6 protection schemes is the use of two parity data portions per several data groups (e.g. using groups of four data portions plus two parity portions in a (4+2) protection scheme, using groups of sixteen data portions plus two parity portions in a (16+2) protection scheme, etc.), the two parities being typically calculated by two different methods. Under one well-known approach, all n consecutive data portions are gathered to form a RAID group, to which two parity portions are associated. The members of a group as well as their parity portions are typically stored in separate drives. Under a second approach, protection groups may be arranged as two-dimensional arrays, typically n*n, such that data portions in a given line or column of the array are stored in separate disk drives. In addition, to every row and to every column of the array a parity data portion may be associated. These parity portions are stored in such a way that the parity portion associated with a given column or row in the array resides in a disk drive where no other data portion of the same column or row also resides. Under both approaches, whenever data is written to a data portion in a group, the parity portions are also updated using well-known approaches (e.g. such as XOR or Reed-Solomon). Whenever a data portion in a group becomes unavailable, either because of disk drive general malfunction or because of a local problem affecting the portion alone, the data can still be recovered with the help of one parity portion, via well-known techniques. Then, if a second malfunction causes data unavailability in the same drive before the first problem was repaired, data can nevertheless be recovered using the second parity portion and related, well-known techniques.

While the RAID array may provide redundancy for the data, damage or failure of other components within the subsystem may render data storage and access unavailable.

Fault tolerant storage systems may be implemented in a grid architecture including modular storage arrays, a common virtualization layer enabling organization of the storage resources as a single logical pool available to users and a common management across all nodes. Multiple copies of data, or parity blocks, should exist across the nodes in the grid, creating redundant data access and availability in case of a component failure. Emerging Serial-Attached-SCSI (SAS) techniques are becoming more and more common in fault tolerant grid storage systems.

The problems of fault tolerant grid storage systems have been recognized in the Prior Art and various systems have been developed to provide a solution, for example:

US Patent Application No. 2009/094620 (Kalvitz et al.) discloses a storage system including two RAID controllers, each having two SAS initiators coupled to a zoning SAS expander. The expanders are linked by an inter-controller link and create a SAS ZPSDS. The expanders have PHY-to-zone mappings and zone permissions to create two distinct SAS domains such that one initiator of each RAID controller is in one domain and the other initiator is in the other domain. The disk drives are dual-ported, and each port of each drive is in a different domain. Each initiator can access every drive in the system, half directly through the local expander and half indirectly through the other RAID controller's expander via the inter-controller link. Thus, a RAID controller can continue to access a drive via the remote path in the remote domain if the drive becomes inaccessible via the local path in the local domain.

US Patent Application 2008/201602 (Agarval et al.) discloses a method and apparatus for transactional fault tolerance in a client-server system. In one example, output data generated by execution of a service on a primary server during a current epoch between a first checkpoint and a second checkpoint is buffered. A copy of an execution context of the primary server is established on a secondary server in response to the second checkpoint. The output data as buffered is released from the primary server in response to establishment of the copy of the execution context on the secondary server.

US Patent Application No. 2007/174517 (Robillard et al.) discloses a data storage system including first and second boards disposed in a chassis. The first board has disposed thereon a first Serial Attached Small Computer Systems Interface (SAS) expander, a first management controller (MC) in communication with the first SAS expander, and management resources accessible to the first MC. The second board has disposed thereon a second SAS expander and a second MC. The system also has a communications link between the first and second MCs. Primary access to the management resources is provided in a first path which is through the first SAS expander and the first MC, and secondary access to the first management resources is provided in a second path which is through the second SAS expander and the second MC.

US Patent Application 2006/010227 (Atluri et al.) discloses a system for providing secondary data storage and recovery services for one or more networked host nodes, and includes a server application for facilitating data backup and recovery services; a first data storage medium accessible to the server application; a second data storage medium accessible to the server application; at least one client application for mapping write locations allocated by the first data storage medium to write locations represented in a logical view of the first data storage medium; and at least one machine instruction enabling direct read capability of the first data storage medium by the server application for purposes of subsequent time-based storage of the read data into the secondary data storage medium.

SUMMARY OF THE INVENTION

In accordance with certain aspects of the present invention, there is provided a storage system comprising a plurality of disk units adapted to store data at respective ranges of logical block addresses (LBAs), said addresses constituting an entire address space divided between a plurality of virtual partitions (VP), and a storage control grid operatively connected to the plurality of disk units and comprising a plurality of data servers, each server having direct or indirect access to the entire address space. Each certain virtual partition is configured to be controlled by at least two data servers among said plurality of data servers: a primary data server configured to have a primary responsibility for handling requests (e.g. I/O requests, configuration-related requests, etc.) directed to any range of LBAs corresponding to said certain virtual partition and a secondary data server configured to have a secondary responsibility for handling requests directed to any range of LBAs corresponding to said certain virtual partition and to overtake the primary responsibility for handling respective requests if the primary server fails. Each data server is configured to have primary responsibility over all LBAs corresponding to at least two virtual partitions and to have secondary responsibility over all LBAs corresponding to at least two other virtual partitions. The storage system may be operable in accordance with file-access storage protocols, block-access storage protocols and/or object-access storage protocols.

In accordance with further aspects of the present invention, the plurality of data servers comprises at least three data servers pre-configured to enable the following re-assignment of responsibilities if one of said servers fails:
  each VP previously primary controlled by the failed server becomes primary controlled by a server previously configured as a secondary server with respect to this VP;
  each VP previously secondary controlled by the failed server becomes secondary controlled by a server other than the newly assigned server with primary responsibility.

In accordance with further aspects of the present invention, the storage system is further configured, in response to a request corresponding to a certain virtual partition, to generate a primary cache object in a data server configured as primary with regard to said certain partition and to generate a corresponding redundancy object in data server configured as secondary with regard to said certain partition, said redundancy object to be deleted upon successful permanent storing of data and/or metadata corresponding to said request while said storing provided by said data server configured as primary, and to be used by said data server configured as secondary for providing permanent storing said data and/or metadata when overtaking primary responsibility.

In accordance with further aspects of the present invention, the redundancy object may be derived from the primary cache object and may need reconstruction in order to enable overtaking primary responsibility. The redundancy object may be further configured to be handled in a searchable data structure with no need to be incorporated into cache-object control procedures and/or dirty data destaging procedures of the secondary server before overtaking the primary responsibility.

In accordance with other aspects of the present invention, there is provided a method of operating a storage system comprising a plurality of disk units adapted to store data at respective ranges of logical block addresses (LBAs), said addresses constituting an entire address space divided between a plurality of virtual partitions (VPs), and a storage control grid operatively connected to the plurality of disk units and comprising a plurality of data servers, each server having direct or indirect access to the entire address space. The method comprises: a) configuring each certain virtual partition to be controlled by at least two data servers, a primary data server configured to have a primary responsibility for handling requests directed to any range of LBAs corresponding to said certain virtual partition and a secondary data server configured to have a secondary responsibility for handling requests directed to any range of LBAs corresponding to said certain virtual partition and to overtake the primary responsibility for handling respective requests if the primary server fails; b) respectively configuring each data server among the plurality of data servers to have primary responsibility over all LBAs corresponding to at least two virtual partitions and to have secondary responsibility over all LBAs corresponding to at least two other virtual partitions.

In accordance with further aspects of the present invention, if the plurality of data servers comprises at least three data servers, the method further comprises: a) responsive to a failure of a data server among said plurality of data servers, i) re-configuring primary responsibility over each VP previously primary controlled by the failed server such that it becomes primary controlled by a server previously configured as a secondary server with respect to this VP; ii) re-allocating secondary responsibility over each VP previously secondary controlled by the failed server in a manner that each such VP becomes secondary controlled by a server other than the newly assigned server with primary responsibility. Re-allocating secondary responsibility may be provided in accordance with a pre-defined allocated table.

In accordance with further aspects of the present invention, the method further comprises: a) responsive to a change in configuration of a certain VP, obtaining by data server having primary responsibility over said certain VP information corresponding to said configuration change; b) sending said information corresponding to said configuration change to the rest of the data servers in said plurality of data servers.

In accordance with further aspects of the present invention, the method further comprises: a) responsive to successful reboot of the failed data server, informing at least all data servers which have overtaken a responsibility over at least one VP assigned to the rebooted data server before its failure that the rebooted server is in operational condition; b) obtaining by said rebooted server the most updated configuration information with regard to all VPs assigned to said rebooted data server before its failure; c) overtaking by said rebooted server primary responsibility over all VPs assigned to the rebooted data server before its failure as to be controlled with primary responsibility and secondary responsibility over all VPs assigned to the rebooted data server before its failure as to be controlled with secondary responsibility.

In accordance with further aspects of the present invention, the rebooted server may overtake overall responsibility in different sequences. For example, the rebooted server overtakes primary and secondary responsibility over a certain VP, then over another certain VP, and continues the overtaking process until gaining responsibility over all VPs assigned to said rebooted data server before its failure. Alternatively, the rebooted server may overtake primary responsibility over all VPs assigned to the rebooted data server before its failure as to be controlled with primary responsibility, and then overtakes secondary responsibility over all VPs assigned to the rebooted data server before its failure as to be controlled with secondary responsibility. Alternatively or additionally, the rebooted server overtakes primary and secondary responsibility over all VPs controlled by a certain data server with primary or secondary responsibility, then over all VPs controlled by another certain data server with primary or secondary responsibility, and continues the overtaking process until gaining responsibility over all VPs assigned to said rebooted data server before its failure.

In accordance with further aspects of the present invention, the method further comprises: a) responsive to a request corresponding to a certain virtual partition, generating a primary cache object in a data server configured as primary with regard to said certain partition; b) generating a corresponding redundancy object in the data server configured as secondary with regard to said certain partition; c) deleting said redundancy object upon successful permanent storing of data and/or metadata corresponding to said request, said storing provided by said data server configured as primary, d) if operation c) fails, using said redundancy object by said data server configured as secondary for providing permanent storing said data and/or metadata when overtaking primary responsibility. The redundancy object may be derivation of the primary cache object and may need to be reconstructed in order to enable overtaking the primary responsibility. The redundancy object may be further configured to be handled in a searchable data structures with no need to be incorporated into cache-object control procedures and/or dirty data destaging procedures of the secondary server before overtaking the primary responsibility.

In accordance with further aspects of the present invention, for plurality of at least three data servers the method further comprises: a) responsive to a shut-down of a data server among said plurality of data servers, said shut-down provided for upgrading said data server, i) re-configuring primary responsibility over each VP previously primary controlled by the shut-down server such that it becomes primary controlled by a server previously configured as a secondary server with respect to this VP; ii) re-allocating secondary responsibility over each VP previously secondary controlled by the shut-down server in a manner that each such VP becomes secondary controlled by a server other than the newly assigned server with primary responsibility, thereby enabling backward compatible upgrade of said data server whilst retaining protection of data related to any respective request.

In accordance with other aspects of the present invention, there is provided a storage system comprising: a) a plurality of disk units adapted to store data at respective ranges of logical block addresses (LBAs), said addresses constituting an entire address space and b) a storage control grid operatively connected to the plurality of disk units and comprising a plurality of data servers. Each certain LBA is assigned to at least three data servers, a primary data server configured to have a primary responsibility for handling I/O requests directed to said certain LBA and to generate a primary cache object in response to an I/O request directed to said certain LBA, a main secondary data server configured to have a secondary responsibility for handling I/O requests directed to said certain LBA and to overtake the primary responsibility for handling I/O requests directed to said certain LBA if the primary server fails and an auxiliary secondary data server configured to have a secondary responsibility for handling I/O requests directed to said certain LBA and to overtake the primary responsibility for handling I/O requests directed to said certain LBA if both the primary server fails and the secondary server fails. The storage system is further configured, in response to said I/O request directed to said certain LBA, to generate redundancy objects in both secondary data servers, said redundancy objects to be deleted upon successful permanent storing respective data and/or metadata by the primary data server or to be used by respective secondary data server for providing permanent storing said data and/or metadata when overtaking primary responsibility. Each redundancy object is derivation of the primary cache object and needs to be reconstructed in order to enable overtaking the responsibility.

Among advantages of certain embodiments of the present invention is implementing efficient mechanisms of redundancy and resilience thus ensuring improved levels of continued data reliability, availability, and protection.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
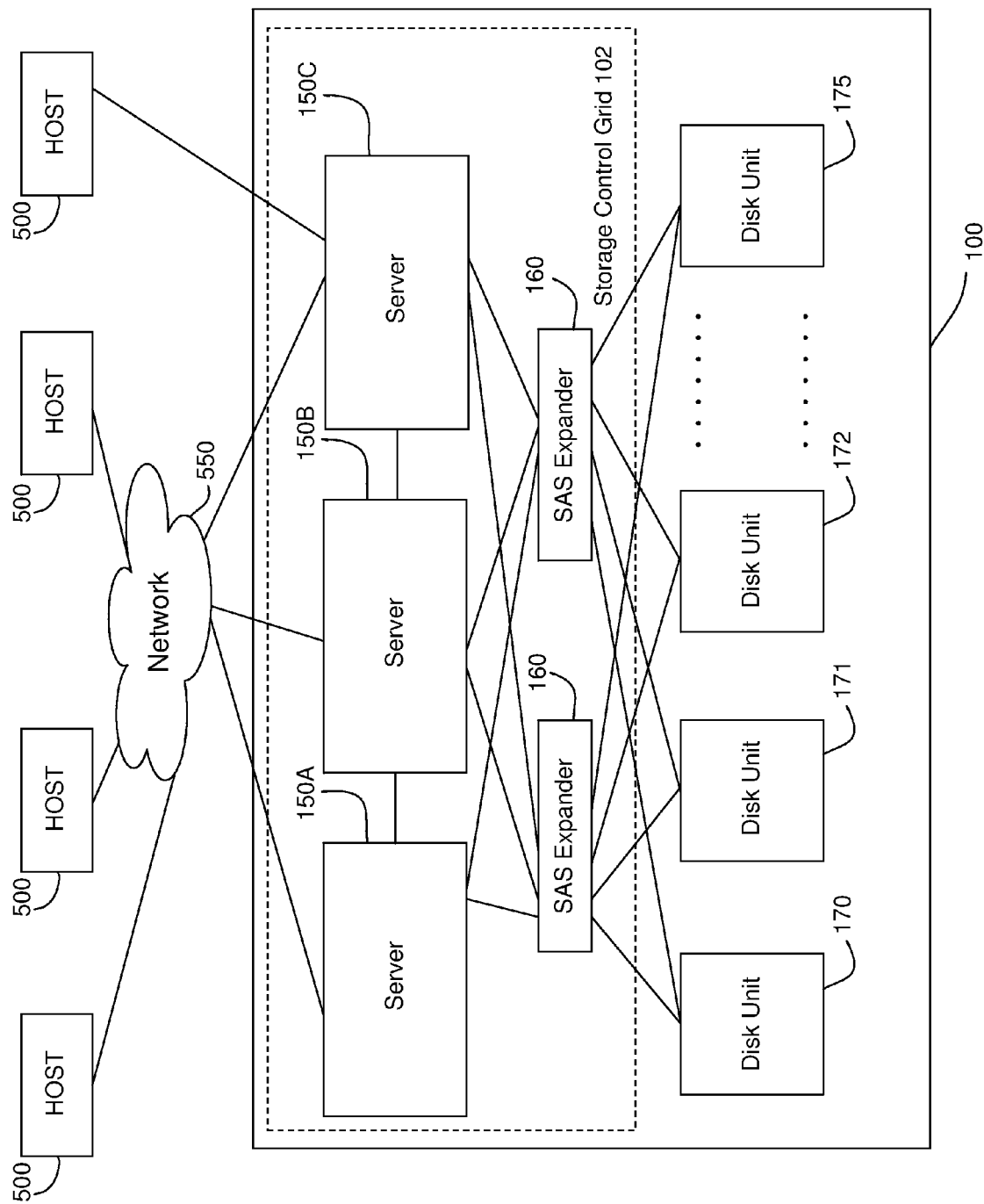
FIG. 1 illustrates a schematic functional block diagram of a SAS-based grid storage system in accordance with certain embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "reading", "writing", "classifying", "allocating" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The references cited in the background teach many principles of cache-comprising storage systems and methods of operating thereof that are applicable to the present invention. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Bearing this in mind, attention is drawn to FIG. 1 illustrating a schematic functional block-diagram of a grid storage system in accordance with certain embodiments of the present invention.

A plurality of host computers (illustrated as 500) may share common storage means provided by a grid storage system 100. The storage system comprises a storage control grid 102 comprising a plurality of servers (illustrated as 150A, 150B, 150C) operatively coupled to the plurality of host computers and operable to control I/O operations between the plurality of host computers and a grid of storage nodes comprising a plurality of disk units (illustrated as 171-175). The storage control grid 102 is further operable to enable necessary data virtualization for the storage nodes and to provide placing the data on the nodes.

Typically (although not necessarily), the servers in the storage control grid may be off-the-shelf computers running a Linux operating system. The servers are operable to enable transmitting data and control commands, and may be interconnected via any suitable protocol (e.g. TCP/IP, Infiniband, etc.).

Any individual server of the storage control grid 102 may be operatively connected to one or more hosts 500 via a fabric 550 such as a bus, or the Internet, or any other suitable means known in the art. The servers are operable in accordance with at least one SAS protocol and configured to control I/O operations between the hosts and respective disk units. The servers' functional block-diagram is further detailed with reference to FIG. 2. Examples of SAS implementations are described in detail in the following documents, each of which is incorporated by reference in its entirety:

"Serial Attached SCSI-2 (SAS-2)", Revision 16, Apr. 18, 2009. Working Draft, Project T10/1760-D, Reference number ISO/IEC 14776-152:200x. American National Standards Institute.

"Serial Attached SCSI Technology", 2006, by Hewlett-Packard Corp., http://h20000.www2.hp.com/bc/docs/support/SupportManual/c00302340/c00302340.pd Data storage formats, such as RAID (Redundant Array of Independent Discs), may be employed to protect data from internal component failures.

Each of the disk units (DUs) 170-175 comprises two or more disk drives operable with at least one SAS protocol (e.g. DUs may comprise SAS disk drives, SATA disk drives, SAS tape drives, etc.). The disk units are operable to store data at respective ranges of logical block addresses (LBAs), said addresses constituting an entire address space. Typically a number of disk drives constituting the disk unit shall enable adequate implementation of the chosen protection scheme (for example, disk units may comprise a multiple of 18 disk drives for a RAID6 (16+2) protection scheme). The DUs functional block-diagram is further detailed with reference to FIG. 3.

In accordance with certain embodiments of the present invention, the storage control grid 102 further comprises a plurality of SAS expanders 160. A SAS expander can be generally described as a switch that allows multiple initiators and targets to communicate with each other, and allows additional initiators and targets to be added to the system (up to thousands of initiators and targets in accordance with SAS-2 protocol). The so-called "initiator" refers to the end in the point-to-point SAS connection that sends out commands, while the end that receives and executes the commands is considered as the "target."

In accordance with certain embodiments of the present invention, each disk unit is directly connected to at least two SAS expanders 160; each SAS expander is directly connected to all disk units. Each SAS expander is further directly connected to at least two interconnected servers comprised in the storage control grid. Each such server is directly connected to at least two SAS expanders. Thus each server has direct access to entire address space of the disk units.

Unless specifically stated otherwise, the term "direct connection of SAS elements" used in this patent specification shall be expansively construed to cover any connection between two SAS elements with no intermediate SAS element or other kind of server and/or CPU-based component. The direct connection between two SAS elements may include remote connection which may be provided via Wireline, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Unless specifically stated otherwise, the term "direct access to a target and/or part thereof" used in this patent specification shall be expansively construed to cover any serial point-to-point connection to the target or part thereof without any reference to an alternative point-to-point connection to said target. The direct access may be implemented via direct or indirect (serial) connection between respective SAS elements.

Figure 2:
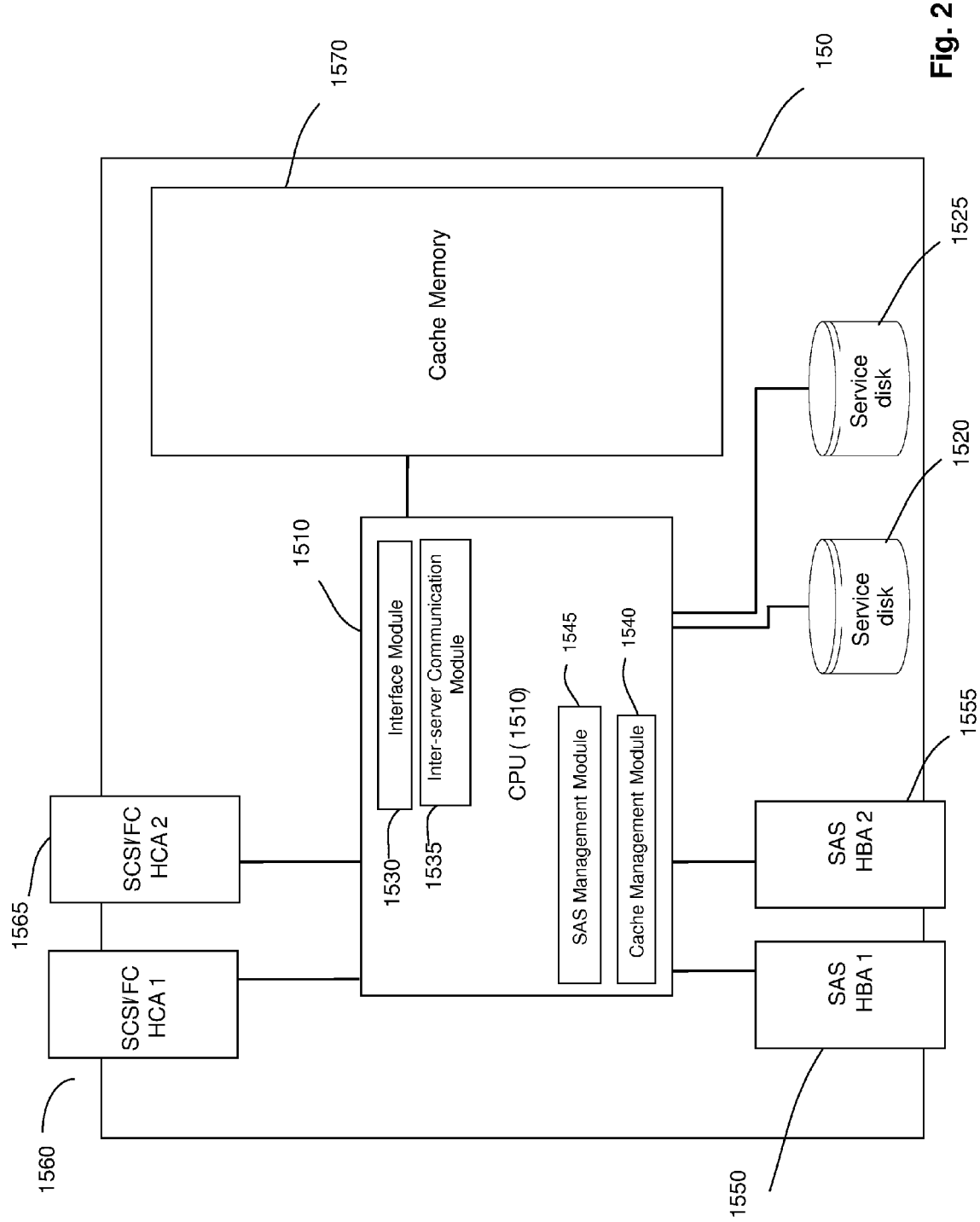
FIG. 2 illustrates a schematic functional block diagram of a SAS server in accordance with certain embodiments of the present invention.

Referring to FIG. 2, there is illustrated a schematic functional block diagram of the SAS server in accordance with certain embodiments of the present invention (e.g. server 150A illustrated in FIG. 1). The server comprises a CPU 1510 operatively coupled to a plurality of service disk drives (illustrated as disk drives 1520 and 1525), that may serve various operational tasks, such as storing meta-data used by the system, emergency storage tasks, etc. The server may also comprise a memory area 1570 operable as a cache memory used during I/O operation and operatively coupled to the CPU. The server further comprises one or more Host Channel Adapters (HCA's) (illustrated as HCA's 1560 and 1565) operatively connected to the CPU and operable to enable communication with the hosts 500 in accordance with appropriate protocols. The server further comprises two or more SAS Host Bus Adapters (HBA's) (illustrated as HBA's 1550 and 1555) operable to communicate with the SAS expanders 160 and to enable the respective data flow. The CPU further comprises a Cache Management Module 1540 operable to control the cache operating, a SAS Management Module 1545 controlling communication and data flow within the Storage Control Grid, an interface module 1530 and an Inter-server Communication Module 1535 enabling communication with other servers in the storage control grid 102.

In certain embodiments of the invention one or more servers may have, in addition, indirect access to disk units connected to the servers via SAS expanders or otherwise (e.g. as illustrated with reference to FIG. 4). The server may be further configured to be responsible for handling I/O requests addressed to directly accessible disks. When the server receives an I/O request, the interface module 1530 checks if the request is directed to the address space within the responsibility of said server. If the request (or part thereof) is directed to an address space out of the server's responsibility, the request is re-directed via the inter-server communication module 1535 to a server responsible for the respective address space (e.g. having direct access to the required address space) for appropriate handling.

Figure 3:
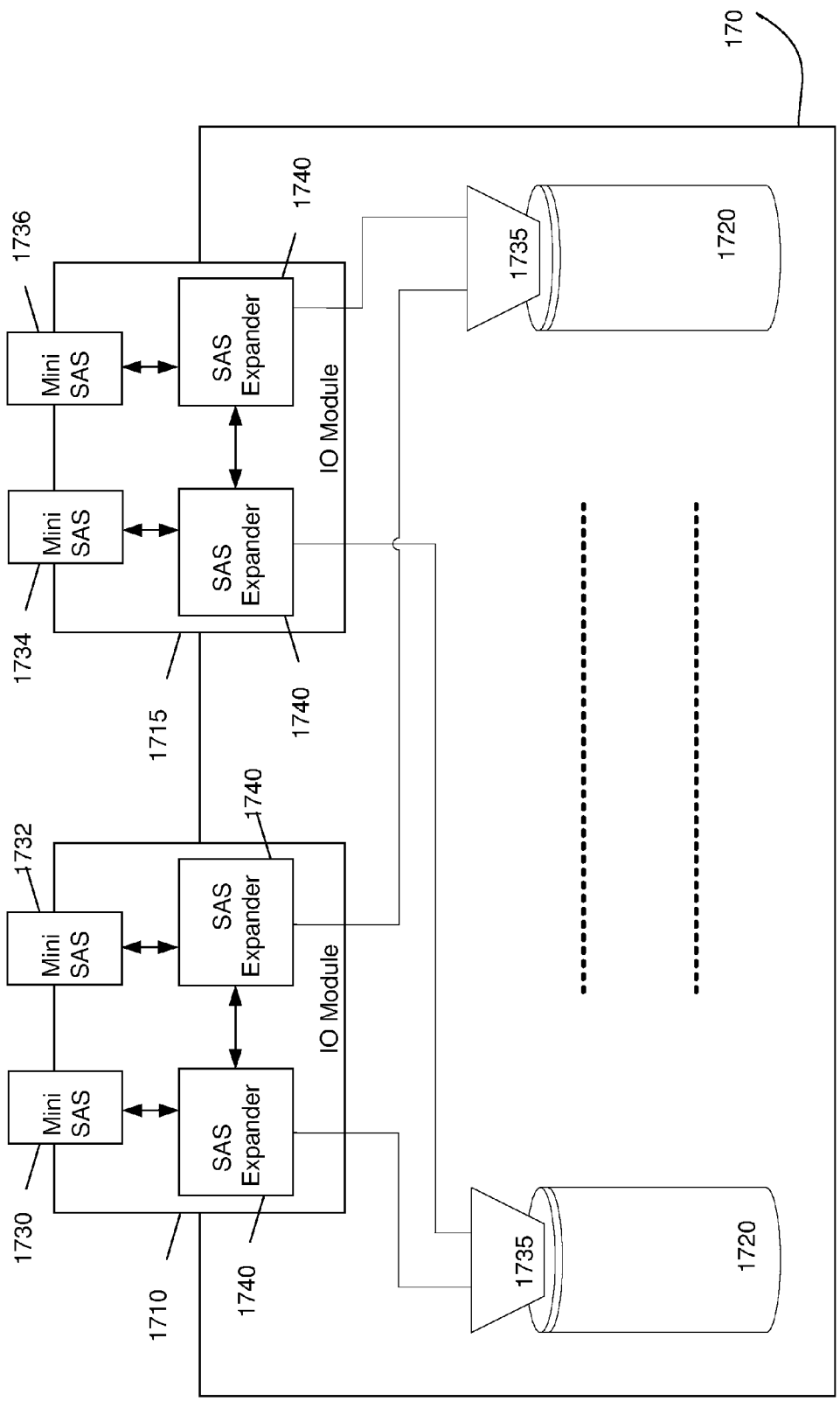
FIG. 3 illustrates a schematic functional block diagram of a SAS disk unit in accordance with certain embodiments of the present invention.

Referring to FIG. 3, there is illustrated a schematic functional block diagram of the SAS Disk Unit (e.g. Disk Unit 170 illustrated in FIG. 1) in accordance with certain embodiments of the present invention. The disk unit comprises a plurality of disk drives 1720. The disk drives may be either SAS drives, SATA drives or other disk drives supported by SAS technology. The DU comprises one or more SAS I/O modules (illustrated as SAS I/O modules 1710 and 1715). The disk drives in the DU may be operatively connected to one or more of the I/O modules. As illustrated in FIG. 3, each disk drive in the disk unit is connected to both SAS I/O modules 1710 and 1715, so that double access to each drive is assured.

Each of two illustrated I/O modules comprises two or more Internal SAS Expanders (illustrated as 1740, 1742, 1744, 1746). In general, SAS expanders can be configured to behave as either targets or initiators. In accordance with certain embodiments of the present invention, the Internal SAS Expanders 1740 are configured to act as SAS targets with regard to the SAS expanders 160, and as initiators with regard to the connected disks. The internal SAS expanders may enable increasing the number of disk drives in a single disk unit and, accordingly, expanding the address space available via the storage control grid within constrains of limited number of ports and/or available bandwidth.

The I/O modules may further comprise a plurality of Mini SAS units (illustrated as units 1730, 1732, 1734 and 1736) each connected to respective Internal SAS expanders. The Mini SAS unit, also known in the art as a "wide port", is a module operable to provide physical connection to a plurality of SAS point-to-point connections grouped together and to enable multiple simultaneous connections to be open between a SAS initiator and multiple SAS targets (e.g. internal SAS expanders in the illustrated architecture).

The disk drives may be further provided with MUX units 1735 in order to increase the number of physical connections available for the disks.

Referring back to FIG. 1, the illustrated architecture of SAS-based grid storage system enables any request to reach the desired LBA via any of the servers, wherein each server covers the entire space address of the disk drives in the storage system. An I/O request coming from a host is initially handled by the CPU 1510 operable to define which data needs to be read or written and from/to which physical location. The request is further forwarded to the respective disk unit via the HBAs 1550 or 1555 and one of the SAS expanders 160, and arrives at the relevant disk unit via one of the internal SAS expanders 1740. No further intervention of CPU is needed along the way after the handling of the request within the Storage Control Grid 102.

Although in terms of software and protocols, SAS technology supports thousands of devices allowed to communicate with each other, physical constrains may limit the number of accessible LBAs. Physical constrains may be caused, by way of non-limiting example, by the limited number of connections in an implemented enclosure and/or limited target recognition ability of an implemented chipset and/or by rack configuration limiting a number of expanders, and/or by limitations of available bandwidth required for communication between different blocks, etc. Certain embodiments of architecture detailed with reference to FIG. 1 enable significant overcoming of such limitations and providing direct access to any LBA in the disk units directly connected to the SAS expanders 160, wherein the number of such directly accessed LBAs may be of the same order as the number allowed by the SAS protocol.

Figure 4:
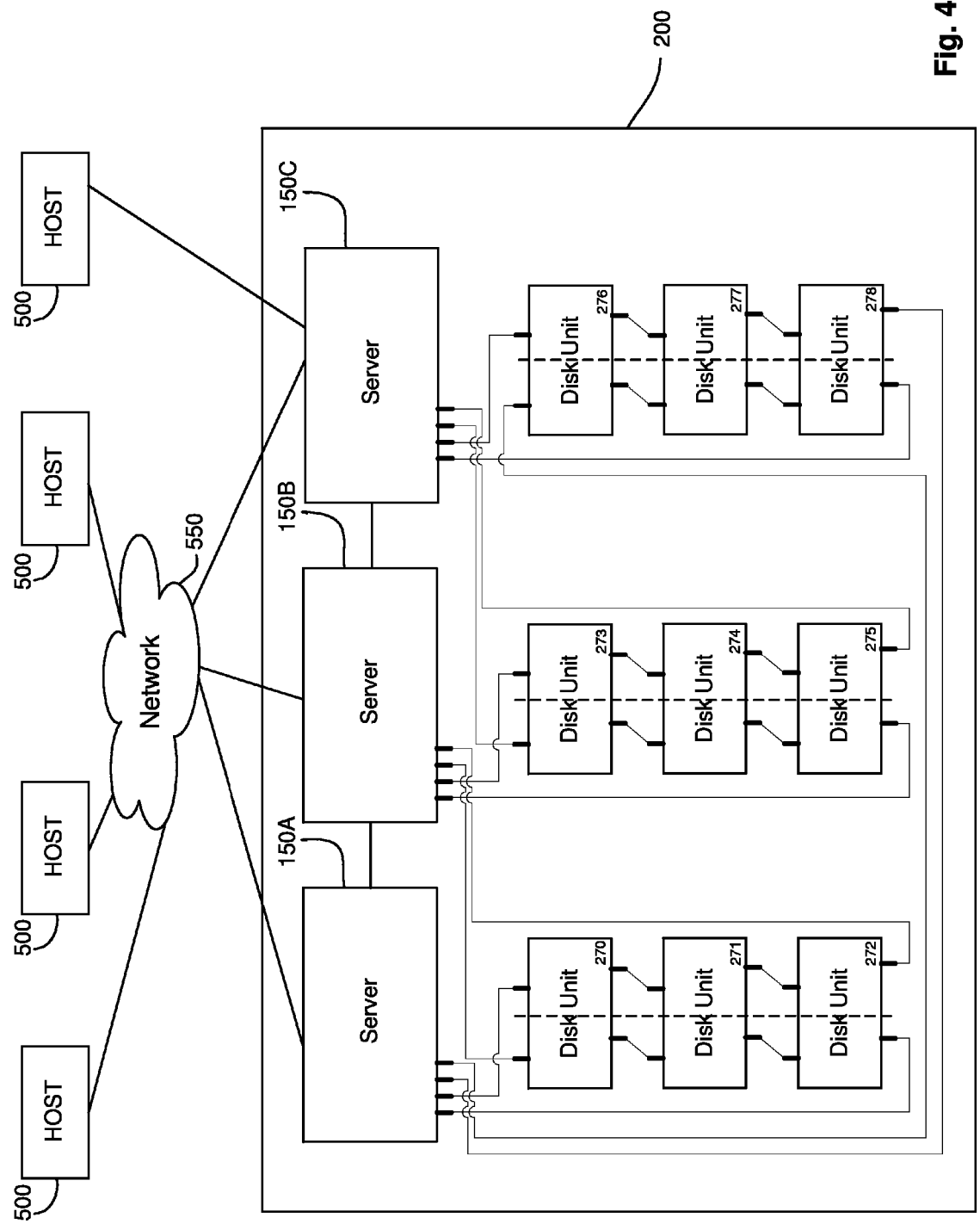
FIG. 4 illustrates a schematic functional block diagram of a SAS-based grid storage system in accordance with certain alternative embodiments of the present invention.

Constrains of limited number of ports and/or available bandwidth and/or other physical constrains may be also overcome in certain alternative embodiments of the present invention illustrated in FIG. 4. The storage control grid is constituted by servers 105A-105C detailed with reference to FIGS. 1 and 2 and operatively connected to a plurality of disk units detailed with reference to FIG. 3. Groups of two or more DUs are configured to form a "daisy chain" (illustrated as three groups of three DUs constituting three daisy chains 270-271-272, 273-275-275 and 276-277-278). The first and the last DUs in each daisy chain are directly connected to at least two servers, the connection is provided independently of other daisy chains. Table 1 illustrates connectivity within the daisy chain 270-271-272. The columns in the table indicate DUs, the rows indicate the reference number of the Mini SAS within respective DU according to reference numbers illustrated in FIG. 3, and interceptions indicate the respective connections (SAS HBAs reference numbers are provided in accordance with FIG. 2). Thus, for instance, Mini SAS 1732 of DU 270, is connected to HBA 152 of sever 150A, and Mini SAS 1732 of DU 271 is connected to Mini SAS 1736 of DU 270.

TABLE 1

| | 1730 | 1732 | 1734 | 1736 |
|---|---|---|---|---|
| 270 | 1554 of 150B | 1552 of 150A | 1730 of 271 | 1732 of 271 |
| 271 | 1734 of 270 | 1736 of 270 | 1730 of 272 | 1732 of 272 |
| 272 | 1734 of 271 | 1736 of 271 | 1550 of 150A | 15562 of 150B |

Mini SAS connectors of I/O modules of a first DU connected to a server or other DUs connected to a previous DU (e.g. 1730 and 1732) are configured to act as targets, whereas Mini SAS connectors in another I/O module (e.g. 1734 and 1736) are configured to act as initiators.

In contrast to the architecture described with reference to FIG. 1, in the architecture illustrated in FIG. 4 each server has direct access only to a part of the entire space address of the disk drives in the storage system (two-thirds of the disks in the illustrated example, as each server is connected to only two out of three daisy chains). However, similar to architecture described with reference to FIG. 1, any request may reach the desired LBA via any of the servers in a manner detailed with reference to FIG. 2. When the server receives an I/O request, the interface module 1530 checks if the request is directed to the address space within the responsibility of said server. If the request (or part thereof) is directed to an address space out of the server's responsibility, the request is re-directed via the inter-server communication module 1535 to a server responsible for the respective address space (e.g. having a direct access to the required address space) for appropriate handling.

The redundant hardware architecture illustrated with reference to FIGS. 1 and 4 provides the storage system of the present invention with failure tolerance.

Figure 5:
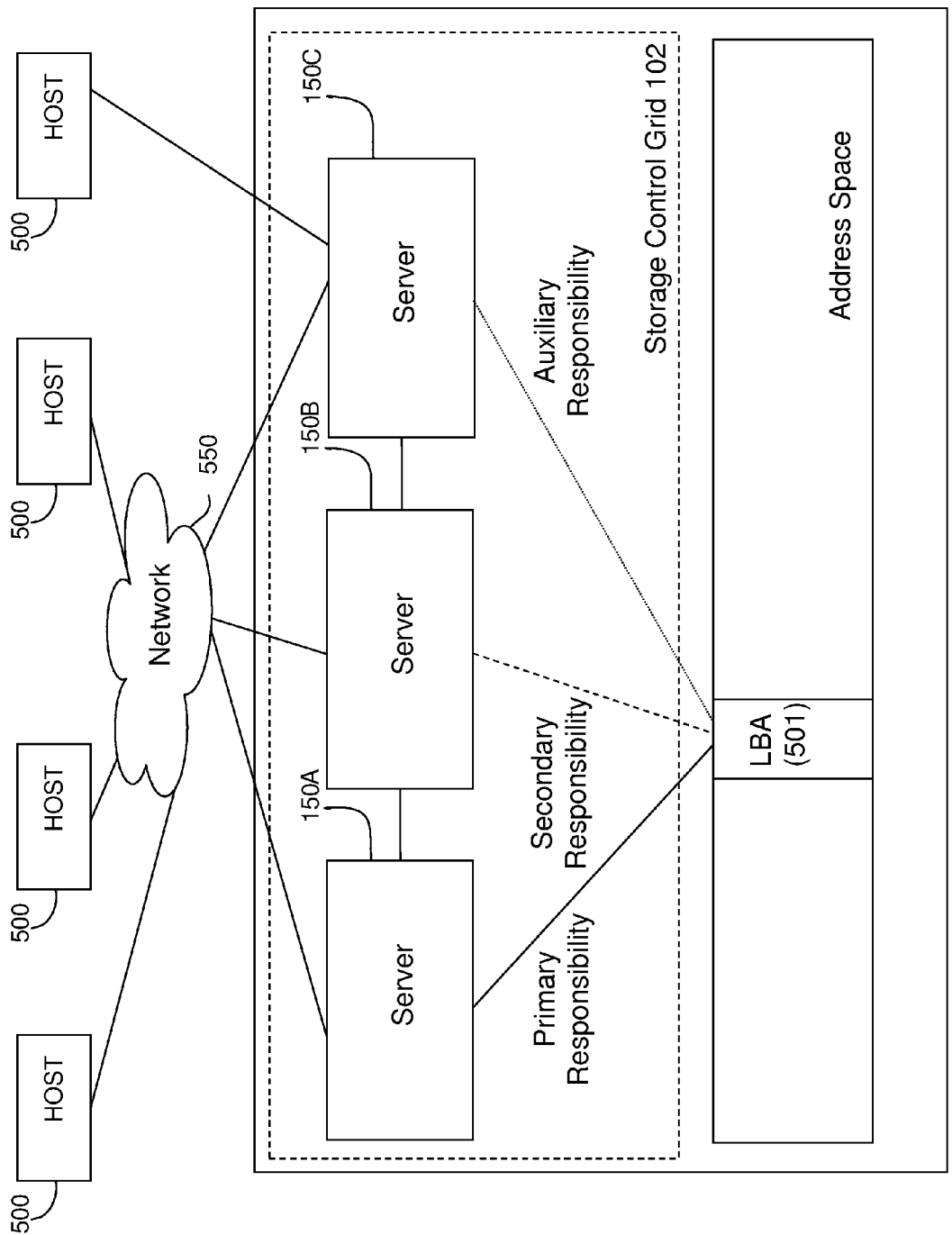
FIG. 5 illustrates a schematic functional block diagram of a fault tolerant configuration of a grid storage system divided in accordance with certain embodiments of the present invention.

In certain embodiments of the present invention availability and failure tolerance of the grid storage system may be further increased as illustrated in FIG. 5. In such embodiments, although each server is provided with direct or indirect access to the entire address space, a responsibility for entire address space is divided between the servers. For example, each LBA (e.g. LBA 501) may be assigned to a server (e.g. 105A) with a primary responsibility and a server (e.g. 105B) with a secondary responsibility with regard to said LBA. It should be noted that responsibility of a certain server may be changed during the operation of the storage system, and the terms "primary server" and "secondary servers" in the following description are related to pre-assigned responsibility of the servers. For example, as will be further detailed with reference to FIGS. 7-8, the secondary server may operate with the primary responsibility during takeover and recovery/retake processes.

For purpose of illustration only, the following description in most cases is provided with respect to I/O requests to be handled by a primary or a secondary server. Those skilled in the art will readily appreciate that the teachings of the present invention are applicable in a similar manner to configuration or similar requests unless specifically stated otherwise.

In certain embodiments of the invention the primary server may be configured to have direct access to the address space controlled with primary responsibility wherein the secondary server may be configured to have direct and/or indirect access to this address space. All I/O requests directed to a certain LBA are handled by a respective primary server. If a certain I/O request is received by a server which is not the primary server with respect to the desired LBA, the request is forwarded to a corresponding primary server. The primary server is operable to temporarily store the data and metadata related to the I/O request thereby generating one or more primary cache objects to be handled in the cache of the primary server. The cache objects may be generated and handled in various ways, some of them known in the art. For example, the cache object may be incorporated into some mechanism (such as LRU, FIFO, etc.) that prioritizes data that is to be kept in or evicted from cache, as well as into some other mechanism that regulates destaging of dirty data into the disk drives, so that respective data and/or metadata ends up being permanently stored in the correct address and disk drive. The storage system is further configured to generate, in response to the I/O request, one or more redundancy objects in the memory of the secondary server, said objects corresponding to the primary cache objects. The redundancy objects may be generated as copies of the primary objects or as derivations thereof as further detailed with reference to FIG. 10. The redundancy object generated as a derivation of the primary cache object may be further configured in a manner enabling its handling in a searchable data structures (e.g. hashed lists) with no need to incorporate the redundancy object into cache-object control procedures before overtaking the primary responsibility.

The primary server acknowledges the transaction to the host only after the secondary server has acknowledged back that the redundancy object is adequately stored in its memory, and, accordingly, the primary cache object becomes redundant. Eventually, after the primary server has permanently stored the data/metadata associated with the primary object in the disk drives, it informs the secondary server that it can delete the corresponding redundancy object from its memory. If the primary server fails before the data has been permanently stored in the disk drives, the secondary server overtakes primary responsibility for said LBA and for appropriate permanent storing of the data corresponding to the redundancy object. Failure of the primary server may be detected with the help of the known "keep-alive" approach or otherwise. The terms "fails" and "failure" with respect to a server should expansively mean any loss of ability to function as desired, including malfunction and shutdown of the server.

In order to further increase availability of the storage system and to enable tolerance to a double hardware failure, each LBA (e.g. 501) may be assigned to three servers: primary server (e.g. 105A), main secondary server (e.g. 105B) and auxiliary secondary server (e.g. 105C). When handling an I/O request, the primary server enables generating respective redundancy objects in both the secondary servers and acknowledges the transaction after both secondary servers have acknowledged that they have stored the redundancy objects in respective memories. After the primary server stores the data corresponding to the primary object in the disk drives, it informs both secondary servers that the respective redundancy objects may be deleted. If the primary server fails before the data has been permanently stored in the disk drives, then the main secondary server will overtake primary responsibility for said LBA. However, if a double failure occurs, the auxiliary secondary server will overtake primary responsibility for said LBA and for appropriate permanent storing of the data. The auxiliary server may also take a role of the main secondary server, in the case of shutdown or other malfunction of the main secondary server.

Figure 6:
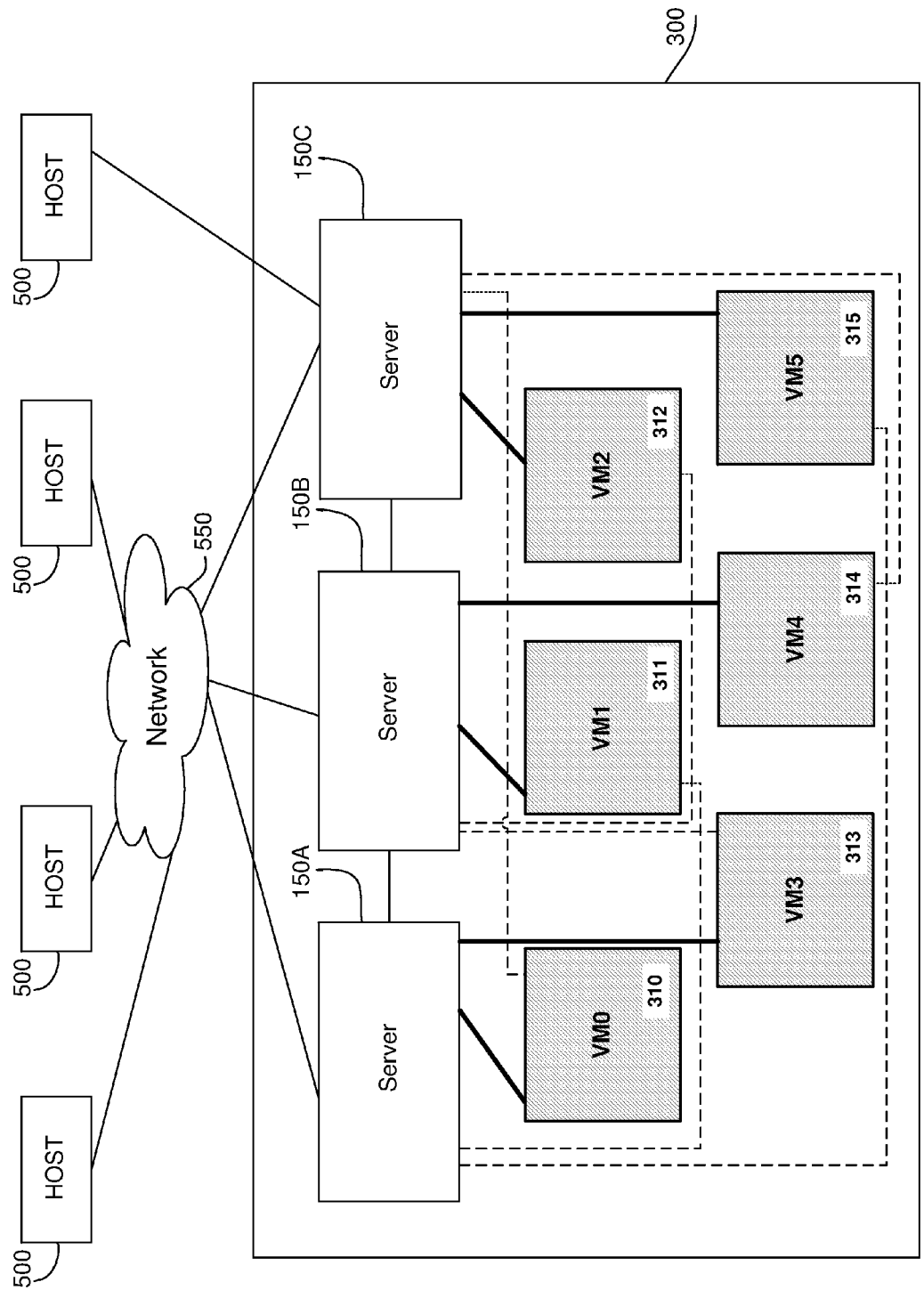
FIG. 6 illustrates a schematic functional block diagram of a grid storage system divided into a plurality of virtual partitions in accordance with certain embodiments of the present invention.

As known in the art, storage virtualization enables referring to different physical storage devices and/or parts thereof as logical storage entities provided for access by the plurality of hosts. Stored data may be organized in terms of logical volumes or logical units (LUs) each identified by means of a Logical Unit Number (LUNs). A logical volume is a virtual entity comprising a sequence of data blocks. Different LUs may comprise different numbers of data blocks, while the data blocks are typically of equal size. The entire storage space may be further divided into a plurality of Virtual Partitions (VPs), each comprising one or more logical volumes. FIG. 6 illustrates a grid storage system 300 divided into a plurality of VPs (310-315). The storage system 300 may be a SAS storage or another grid storage system comprising virtualized storage space and the control grid. At least for redundancy purposes the control grid shall comprise two or more servers, while for resilience purposes (e.g. to keep operating in redundant mode in case one server fails) the control grid shall comprise three or more servers. For purpose of illustration only, the following description is provided with respect to VPs having an equal size. Those skilled in the art will readily appreciate that the teachings of the present invention are applicable in a similar manner to VPs with variable size.

In accordance with certain embodiments of the present invention, each server has direct or indirect access to the entire address space. Responsibility for the partial address space covered by each VP is distributed among the servers, in such a manner that each server is assigned with primary responsibility (i.e. as a primary server) over at least two VPs, and is assigned with secondary responsibility (i.e. as a secondary sever) over at least two additional VPs. Each VP is controlled by at least two servers—primary server and secondary server. As illustrated in FIG. 6, by way of non-limiting example the servers are configured in accordance with Table 2, and the virtual partitions are respectively configured in accordance with Table 3.

TABLE 2

| Server | Primary Responsibility (continuous line in FIG. 6) | Secondary Responsibility (dashed line in FIG. 6) |
|---|---|---|
| 150A | VP0, VP3 | VP1, VP5 |
| 150B | VP1, VP4 | VP2, VP3 |
| 150C | VP2, VP5 | VP0, VP4 |

TABLE 3

| VP | Primary Responsibility | Secondary Responsibility |
|---|---|---|
| VP0 | 150A | 150C |
| VP1 | 150B | 150A |
| VP2 | 150C | 150B |
| VP3 | 150A | 150B |
| VP4 | 150B | 150C |
| VP5 | 150C | 150A |

The terms "primary responsibility" or "primary control" with regard to a VP should expansively mean that the server handles all I/O requests directed to LUs defined in the VP. When the host sends a write request to the system directed to a certain LU defined in a certain VP, the respective server with primary responsibility temporarily stores the respective cache object, and is eventually responsible to handle it so that respective data and/or metadata ends up being permanently stored in the correct address and disk drive. The server with primary responsibility is also responsible for retrieving the data/metadata each time that the host requests it. In accordance with certain embodiments of the present invention, when, responsive to I/O request to a certain VP, the server with primary responsibility generates the primary cache object, it also enables generating corresponding redundancy object to be stored in the cache memory of the server having secondary responsibility over that certain VP. The primary server acknowledges the transaction to the host only after receiving acknowledgement from the secondary server that the redundancy object is generated in its cache. Upon successful permanent storing the data in the disk drives, the primary server informs the secondary server that the secondary server can delete the redundancy object from its cache. However, if the primary server fails in permanently storing the data in the disks, the secondary server overtakes primary responsibility on the said VP and on permanent storing the data and, as will be further detailed with reference to FIG. 10, uses the redundant object for further operating.

Those versed in the art will readily appreciate that the invention is not bound by the architecture of the grid storage system described with reference to FIGS. 5-6. Equivalent and/or modified functionality may be consolidated or divided in another manner and may be implemented in any appropriate combination of software, firmware and hardware. In different embodiments of the invention the functional blocks and/or parts thereof may be placed in a single or in multiple geographical locations (including duplication for high-availability); operative connections between the blocks and/or within the blocks may be implemented, when necessary, via a remote connection.

Figure 7:
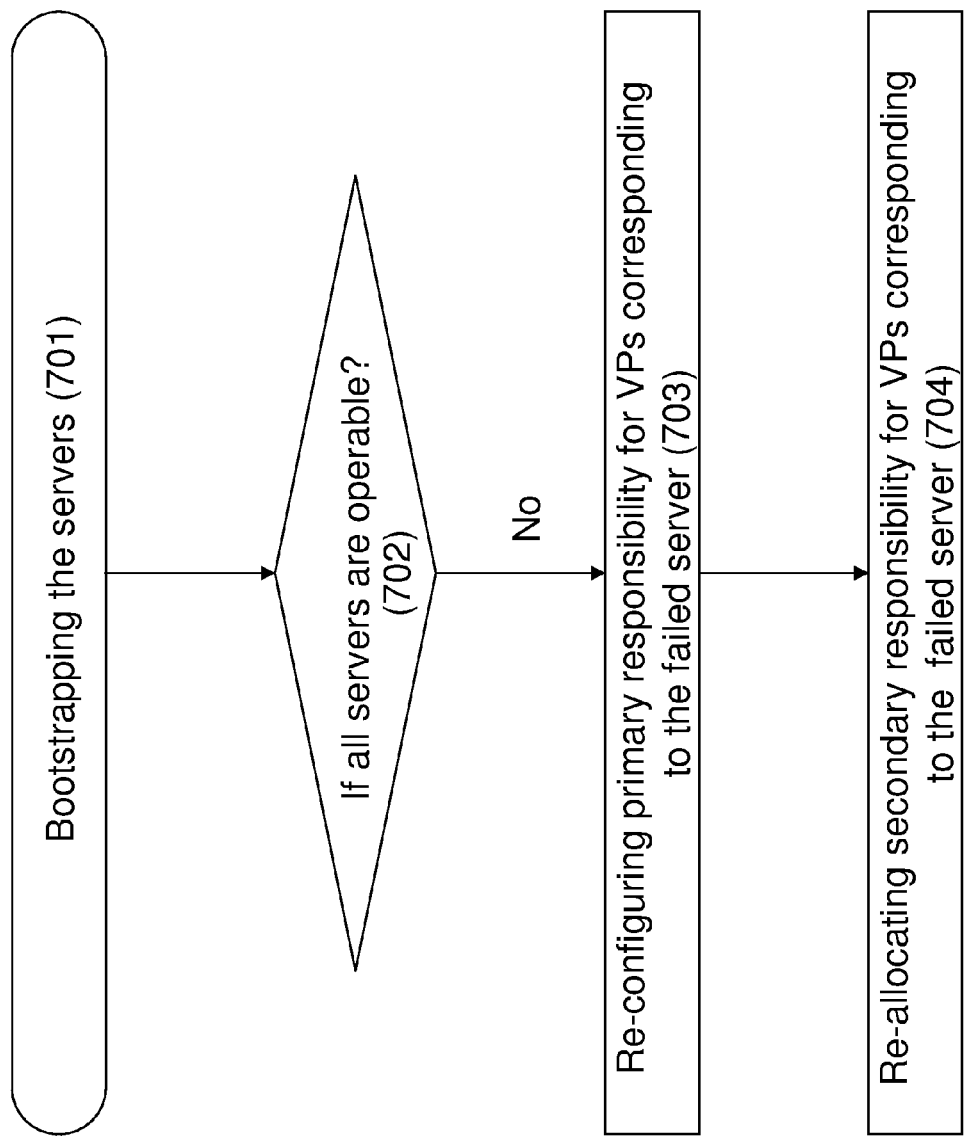
FIG. 7 illustrates a schematic flow-chart of a server takeover process in accordance with certain embodiments of the present invention.

Referring to FIG. 7, there is illustrated a schematic flowchart of a takeover process in a case of a failure of a primary server in three-server configuration.

Resulting from a bootstrapping process (701), the servers are up and running; and the Virtual Partitions are configured, by way of non-limiting example, as detailed with reference to FIG. 6. Information related to configuration of each VP may be accommodated in a Virtual Partition Configuration File (VPCF). Such information may include information on respective LUs, distribution mappings, Utilization Bitmap, snapshots, dynamic allocation of space for Thin Volumes, etc. The VPCF may be periodically saved in one or more disk units at pre-determined periods of time (e.g. every 30-60 minutes, so as not to impact performance). Accordingly, the metadata stored in VPCF are permanently saved. Status and configuration files maintained by the servers may be further protected in accordance with a protection scheme implemented in the storage system, and saved in a Physical Space Address Header in, for example, the first RAID Group of each VP. The location of this RAID group on the disks is fixed as part of the basic configuration of the system, so that in case of recovery, the server will be able to retrieve this information.

In accordance with certain embodiments of the present invention, changes in the VP configuration between the saves of VPCF may be written to a Recent Configuration Changes File (RCCF), which, in the case of emergency power-off, may be saved in one or more Server Service Disk Drives (e.g. 1520 in FIG. 2). RCCF may be configured as a linked file that is erased every time when VPCF is saved. If the buffer allocated in the server on behalf of the RCCF becomes full, VPSF may be saved before the planned time. In addition, each server may maintain, with respect to its primary VPs, a Dirty Data Log File (DDLF). The DDLF may be configured as a linked list of pointers to dirty objects currently handled in the cache (e.g. 1570 in FIG. 2) of the server. In case of shutdown or emergency power-off, the DDLF helps in a process of destaging the dirty data currently handled in the cache. The RCCF and the DDLF may be combined together to form a Server Log File (SLF) which may be saved in one or more Server Service Disk Drives. Status of each server may be handled in a respective Server Status File (S SF).

The storage system is configured to check (702) if all servers are operable. Such a check may be provided in a variety of manners, some of them known in the art. In accordance with certain embodiments of the present invention, if a failure of a certain server is identified, the storage system re-configures (703) primary responsibility over VPs corresponding to the failed server. The storage system is further configured to allocate (704) operable servers for secondary responsibility for VPs corresponding to the failed server. Thus, after the re-configuration process is finished, the system continues to work in protected mode although one of the servers has failed. Accordingly, if one server fails, not only is data not lost (redundancy), but also the system continues to operate with protection of data related to any I/O request (resilience). In case of double failure when a second server also fails, still no data is lost, and the system can either continue to work normally (but without the same redundancy level at the cache), or switch to a read-only mode.

Table 4 illustrates, by way of non-limiting example, re-configuration of the primary responsibility (for VP0 and VP3) and the secondary responsibility (for VP1 and VP5) in the case of a failure of the server 105A illustrated in FIG. 6.

TABLE 4

| Server | Primary Responsibility | Secondary Responsibility |
|---|---|---|
| ~~150A,~~ | ~~VP0, VP3~~ | ~~VP1, VP5~~ |
| 150B | VP1, VP4, VP3 | VP2, ~~VP3~~, VP5, VP0 |
| 150C | VP2, VP5, VP0 | ~~VP0~~, VP4, VP1, VP3 |

Thus, the servers and VPs are re-configured in the following manner:
each VP previously primary controlled by the failed server becomes primary controlled by a server previously configured as a secondary server with respect to this VP;
each VP previously secondary controlled by the failed server becomes secondary controlled by a server other than the newly assigned primary server.

The re-allocation of the secondary responsibility may be provided in accordance with a pre-defined allocated table configured for the cases of failure of assigned servers. Alternatively or additionally, the allocation may be provided on-the-fly, for example based on a load-balancing approach or otherwise. In a similar manner, re-allocation of the secondary responsibilities may be provided in case of failure of a secondary server whilst keeping assigned primary responsibilities.

In order to enable re-allocation of primary and secondary responsibility, each server may be configured to accommodate the most updated versions of VPCFs of all VPs. By way of non-limiting example, each primary server may send to the rest of the servers the changes in VPCFs of virtual partitions (e.g. respective RCCF files) which are in its primary responsibility.

Figure 8:
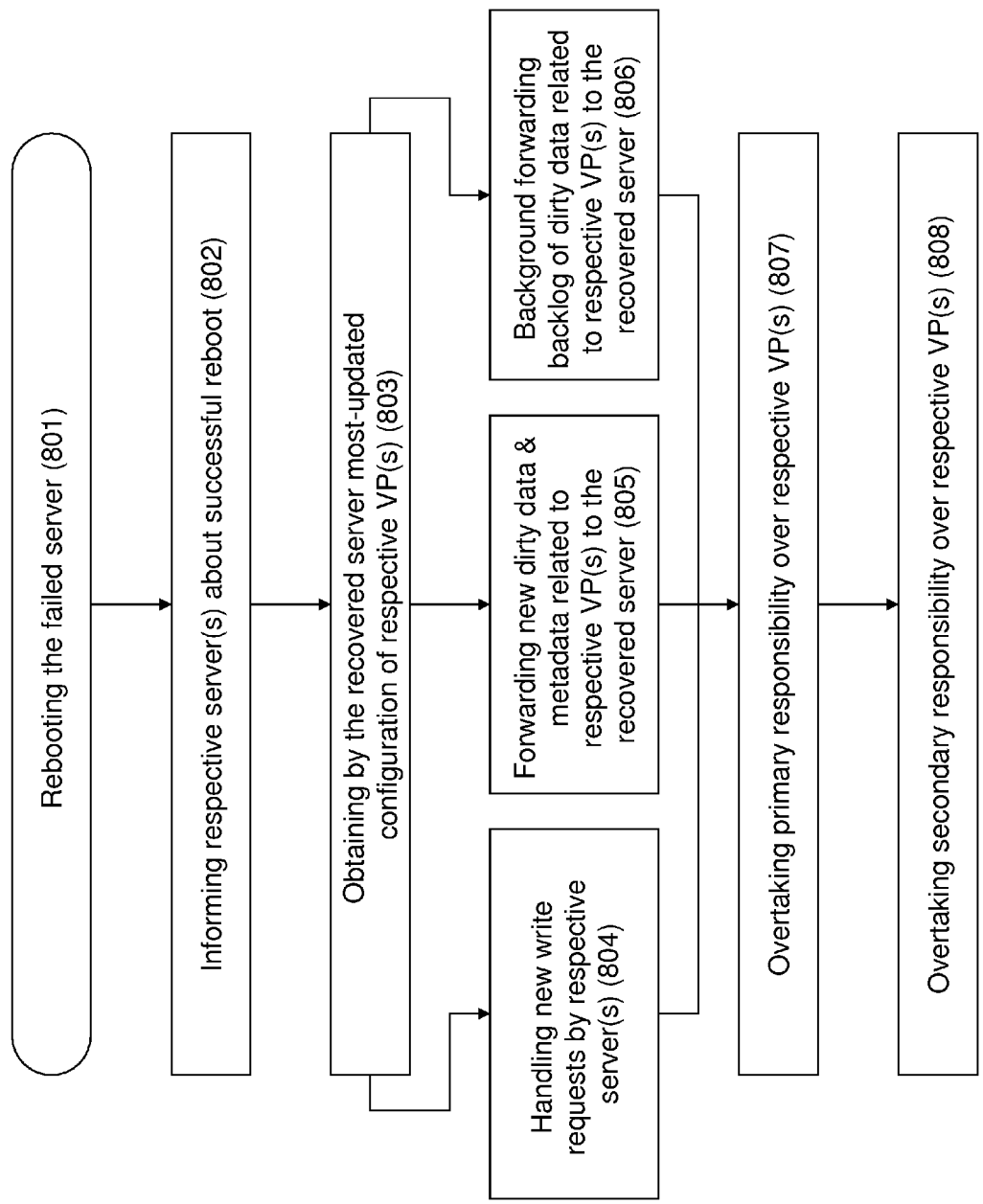
FIG. 8 illustrates a schematic flow-chart of a server recovery and responsibility retake process in accordance with certain embodiments of the present invention.

If a failed server restarts after a certain period of time, it may retake responsibility. The schematic flow-chart of server recovery and responsibility retake process is illustrated in FIG. 8. When a failed server recovers and reboots (801), it may read the Server Status File. Since reboot takes place after the server has failed, the Status File will indicate "online" status, thus indicating to the server that the boot is provided after a failure (as opposed to the installation or initialization stages). The recovered server informs (802) the servers involved in the take-over process (i.e. servers which have overtaken responsibility over at least one VP assigned to the recovered server before the failure) that it is up and running. The retake process may be provided for each such involved server sequentially as described below. Alternatively, the process may start with retaking the primary responsibility from all respective servers followed by retaking the secondary responsibility from all respective servers. Alternatively or additionally, some or all operations related to different VPs may be provided in parallel.

Referring to the example illustrated in FIG. 7, server 150A informs server 150B about successful reboot; obtains the last update of VP3 configuration from server 150B, and reads saved in the system disk drive VPCF file of VP3. Thus server 150A obtains (803) updated VP3 configuration. Server 150A becomes now secondary for VP3, as illustrated in Table 5. At this point, server 150B still holds dirty data corresponding to VP3.

TABLE 5

| Server | Primary Responsibility | Secondary Responsibility |
|---|---|---|
| 150A | ~~VP0, VP3~~ | VP3, ~~VP1, VP5~~ |
| 150B | VP1, VP4, VP3 | VP2, VP5, VP0 |
| 150C | VP2, VP5, VP0 | ~~VP0~~, VP4, VP1 |

New write requests to VP3 continue to be handled (804) by server 150B (since server 150A is still secondary for VP3), however the respective dirty data (e.g. DDLF file) and dirty metadata (e.g. RCCF file) are sent (805) to server 150A (e.g. as SLF file or separately). On the background, backlog of dirty data previously accumulated in the cache of server 150B and related to VP3 are also continually sent (706) to server 150A. Thus, upon completing the background process (806), server 150A accommodates copies of all dirty data written to VP3 and utmost updated VP3 configuration. After that, server 150A overtakes (807) primary responsibility over VP3, and then, it also overtakes (808) secondary responsibility over VP5. The resulting configuration is illustrated in Table 6.

Responsive to information received (802) from server 105A that it has returned to the operational condition, server 150B saves VPCF of VP3 in disk drive. Server 150B continues to handle modifications of VPCF of VP3 during operations 803-806, however without saving updated VPCF file in the system disk drive.

TABLE 6

| Server | Primary Responsibility | Secondary Responsibility |
|---|---|---|
| 150A | ~~VP0~~, VP3 | ~~VP1~~, VP5 |
| 150B | VP1, VP4 | VP2, VP0 |
| 150C | VP2, VP0 | ~~VP0~~, VP4, VP1 |

Operations 802-807 further repeated for primary responsibility retake over VP0 from server 150C, and for secondary responsibility retake over VP1 from server 150B. As a result, the storage system returns to initial responsibility assignment, as was illustrated in FIG. 5 and Tables 2 and 3.

Operations 805 and 806 shall be provided in a manner preserving an order of writes. For example, before or during sending to server 150A a data block related to VP3, server 150B may receive a write request related to this block. Accordingly, write and sent procedures shall be performed under block lock, namely:
a data block shall not be sent to server 150A until the write operation is completed;
a write request to a data block being sent from server 150B to server 150A, shall not be performed until the block has been sent/acknowledged.

The above block lock may be implemented with the help of various approaches, some of them known in the art.

In a case when a user voluntarily shuts down the system, all dirty data and dirty meta-data (such as, for example, the configuration files) are safely destaged to the system disks, according to the standard destage procedures implemented in the storage system. The status in the Server Status File is set to "power off", and the system may safely shut down.

In case of emergency shutdown when the system is shut down without guaranteed time for a complete shutdown procedure (e.g. in the case of external power failure), all dirty data and dirty meta-data are safely destaged to the server service disks (e.g. 1520,1525) in contrast to the regular shutdown above when destaging is provided to the system disks. The servers are protected by UPS, configured to enable enough time for destaging data from server's cache to server's service disks. Further, the status in the Server Status File is set to "power off", and the system may safely shut down.

When the storage system restarts after a shutdown, the servers read the SSF file. Among other things, the SSF indicates the physical location of the Physical Address Space Header for respective VPs. Each server reads respective content of the Physical Address Space Header (e.g. RCCF and VPCF for respective VPs) from its location on the system disk, and reads Server's Service Drives for additional information that may be contained in the Server Log File (SLF). In case of voluntary shutdown the files associated with the SLF (i.e., RCCF and DDLF) are empty, while in a case of an emergency shutdown these files contain the most updated data. Accordingly, each server update, if necessary, configuration files of its primary controlled VPs, and user dirty data are destaged from the server's cache, as a part of the standard activity.

Figure 9:
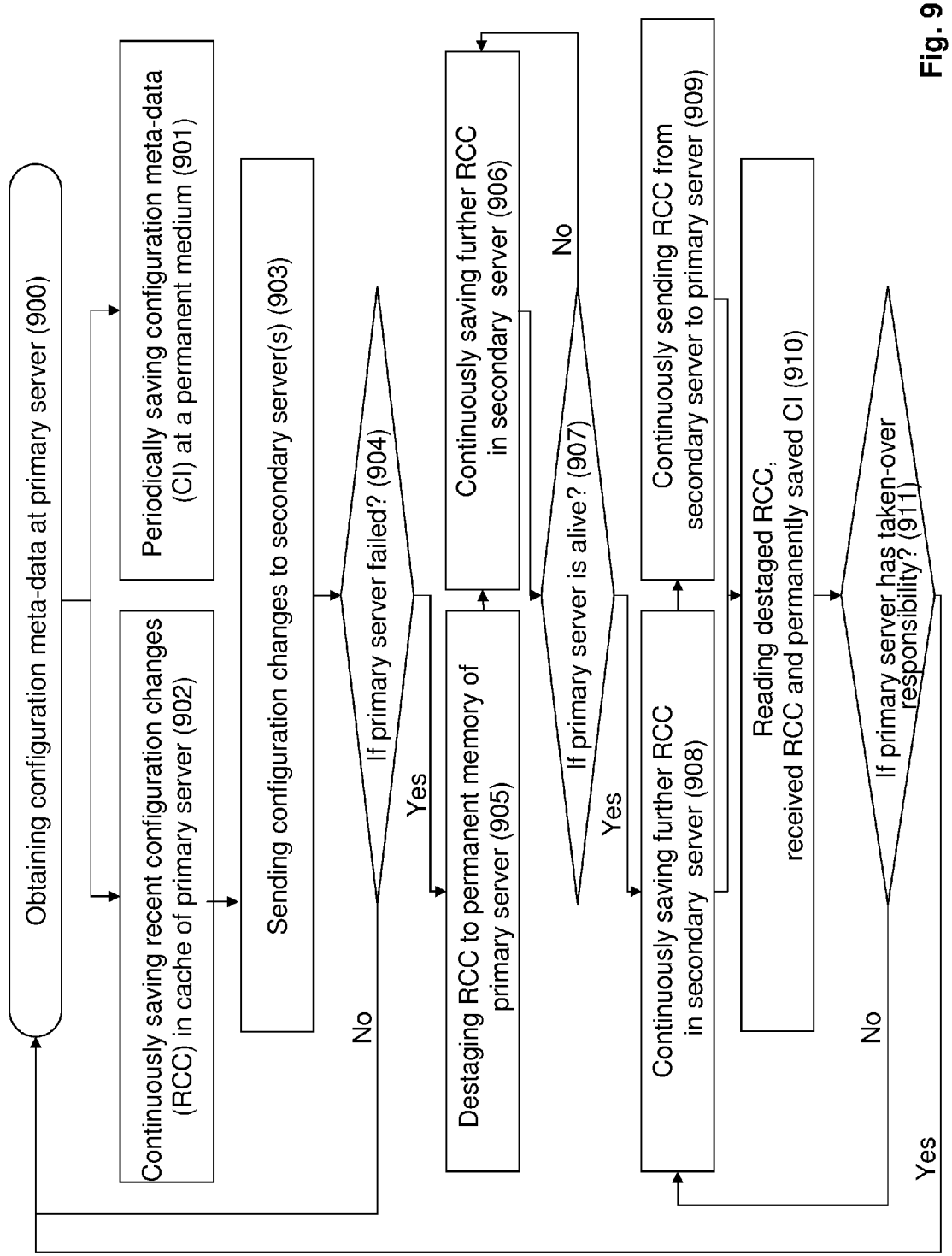
FIG. 9 illustrates a schematic flow-chart of handling configuration information during regular operation, handover and recovering processes in accordance with certain embodiments of the present invention.

FIG. 9 illustrates a schematic flow-chart of handling configuration information during regular operation, handover and recovering processes in accordance with certain embodiments of the present invention. Those versed in the art will readily appreciate that the disclosed technique is not bound by the architecture of the grid storage system described with reference to FIGS. 5-6, and, likewise, applicable to other control grid architectures comprising at least two servers, one server with the primary responsibility, and one or more servers with the secondary responsibility over a certain data range. The primary server continuously obtains (900) information indicative of configuration related to the certain data range. Such information may include information on current status and/or changes related to respective LUs, distribution mappings, Utilization Bitmap, snapshots, dynamic allocation of space for Thin Volumes, etc. The respective configuration metadata (CI) may be accommodated as a Configuration File or otherwise. The configuration metadata is periodically saved (902) at a permanent storage medium (e.g. one or more system disk units). This CI may be further protected in accordance with a protection scheme implemented in the storage system, and saved in a pre-defined place (e.g. in a Physical Space Address Header) so that in case of recovery, the server will be able to retrieve this information.

The primary server further continuously saves (902) changes in the CI obtained after the last save operation of CI, these changes being referred to hereinafter as recent configuration changes (RCC). These changes may be written to a Recent Configuration Changes File (RCCF), configured, by way of non-limiting example, as a linked file that is erased every time the CI is saved. If the buffer allocated in the server on behalf of the RCCF becomes full, CF may be saved before the planned time. The primary server sends (903), directly or indirectly, RCC to all servers configured as secondary servers with respect to the certain data range.

The storage system is configured to check (904) if the primary server is operable. If the primary server fails, RCC is destaged (906) from the cache memory of the primary server to a permanent memory. In accordance with certain embodiments of the present invention, the servers comprise one or more server service disk drives (e.g. 1520 in FIG. 2) and are protected by UPS configured to enable enough time for destaging data from a server's cache to a server's service disks. Accordingly, in the case of failure (e.g. shutdown, emergency power-off, etc.), RCC is destaged to the service disk drive of the primary server.

After the secondary server is allocated to take-over the primary responsibility over the certain data range, further RCC are continuously saved (905) in the secondary server. When replacing the failed primary server, the secondary server periodically saves (not shown) configuration metadata in storage system disk drives.

After the storage system receives indication (907) that the primary server is re-booted, the secondary server still performs primary responsibility and continues to save (908) RCC. In parallel, the secondary server sends (909) the recent configuration changes to the re-booted primary server. However, neither of these servers saves the configuration information until the primary server takes-over the primary responsibility.

The primary server reads (910) configuration information saved in the system disks, RCC received from the secondary server and RCC destaged after the failure, and, thereby, obtains updated configuration. After the primary server takes-over responsibility over the certain data range (e.g. after configuration with regard to all data ranges controlled by the primary server is updated) the storage system returns to its initial responsibility assignment. The primary server obtains configuration information and handles it as before the failure.

Figure 10:
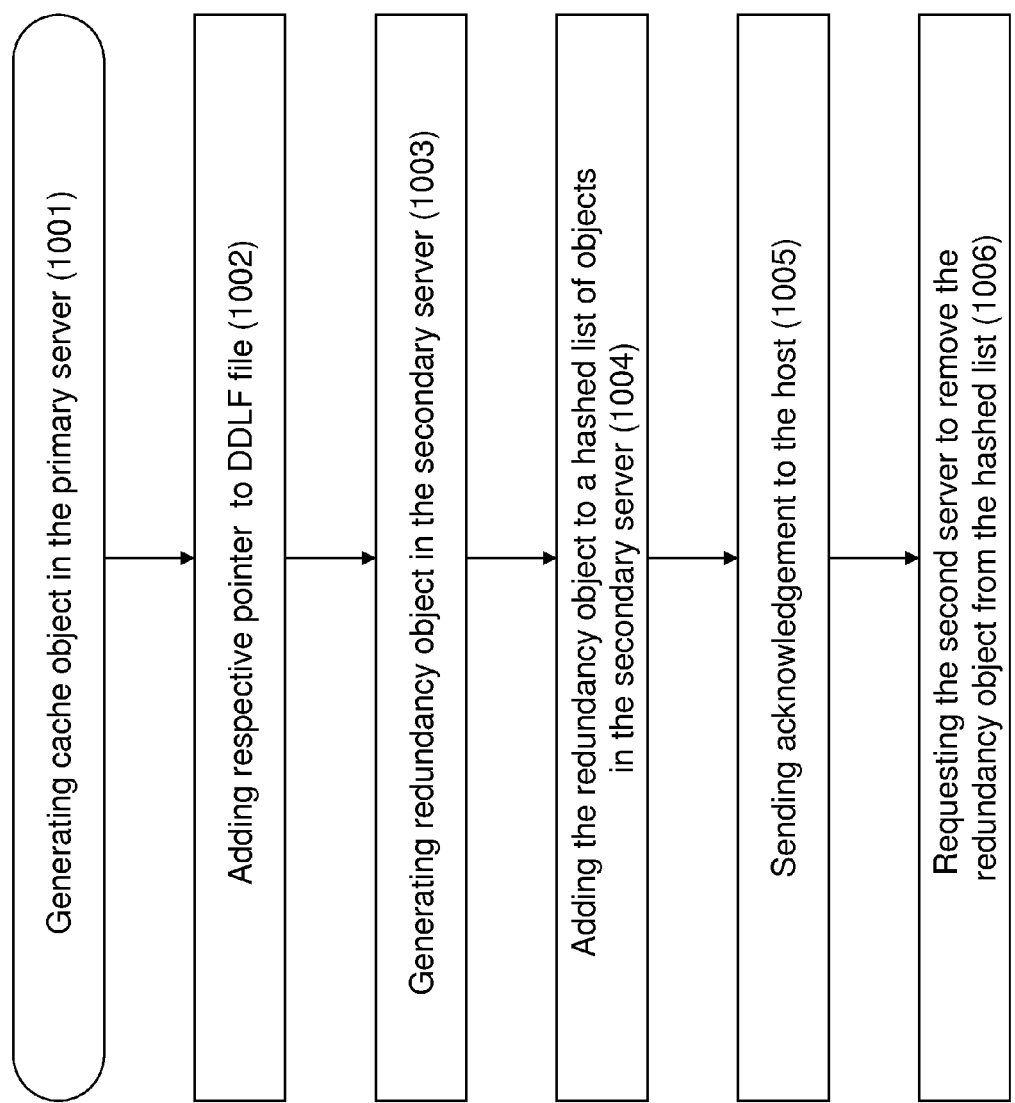
FIG. 10 illustrates a schematic flow-chart of a process of generating cache redundant objects in accordance with certain embodiments of the present invention.

Referring to FIG. 10, there is illustrated a schematic flow-chart of a process of generating cache redundant objects in accordance with certain embodiments of the present invention. This process may be used to protect dirty objects in cache, i.e. objects that are currently handled in cache and have not yet been saved to the storage system's disks. By way of non-limiting example, the process may be used in certain embodiments of the invention detailed with reference to FIGS. 5-8. Cache objects may comprise user's data and/or configuration-related metadata and/or partial results of parity calculations that arise as part of the RAID 6 procedure, scrubbing processes, etc. For purpose of illustration only, the following description is provided with respect to cache objects comprising dirty user's data only. Those skilled in the art will readily appreciate that the teachings of the present invention are applicable in a similar manner to any other cache object comprising data and/or metadata to be destaged and/or temporary data/metadata to be used in further processing.

In accordance with certain embodiments of the invention, the storage system is configured, responsive to a certain request and respective generating (1001) an object in the primary server's cache, to provide the following operations: adding (1002) a respective pointer to DDLF file; generating (1003) a copy of the cache object or derivative thereof to be saved in the secondary server, thus generating a redundancy object; adding (1004) the redundancy object to a searchable data structure (e.g. a hashed list of objects) in the secondary server, said structure comprising redundancy objects corresponding to respective objects in the primary server.

Sequence of operations 1002-1004 may be defined as an "atomic operation" with regard to an operation system running on the servers. Internal code running on the servers may be designed to perform in a "thread-safe" way, namely enabling that only one thread may ever modify the same object at a given time, though various threads may be read simultaneously. Accordingly, only when the operations 1002-1004 of the above "atomic transaction" are completed, the primary server returns status (1005) to the host.

Upon completion of operations 1002-1004, the cache object in the primary server becomes redundant, and retains this status until the primary server has destaged its data into the system's drives. Eventually, after the cache object is removed from the cache of the primary server, its pointer is also removed from the DDLF and, at the end of the transaction, a command is sent (1006) to the secondary server to remove the redundancy object also from the hashed list.

As was noted with reference to FIG. 5, the redundancy object may be generated as a copy of the primary object or as a derivation thereof. In a case of derivation, the redundancy object is derived from the primary object in a manner facilitating respective reconstruction into a copy of the primary object, if necessary. By way of non-limiting example, the redundancy object may be generated as a serialized or as a compressed version of the primary cache object. In accordance with certain embodiments of the present invention, the redundancy object may be further configured in a manner enabling its handling in searchable data structures (e.g. hashed lists) with no need to incorporate the redundancy object into cache-object control procedures, nor in procedures of dirty data destaging of the secondary server before overtaking the primary responsibility. As a modified version of the primary cache object, the redundancy object may be smaller, faster to transmit, and easier to handle in the secondary server than a copy of a primary object. In the case of failure of the primary server, the secondary server reconstructs such a redundancy object into a copy of the primary object, accommodates the reconstructed redundancy object within the cache, and incorporates the reconstructed object into the local cache management and destaged mechanisms. As a result of these operations, the reconstructed redundancy object may be used by the secondary server for primary control of respective data range.

Figure 11:
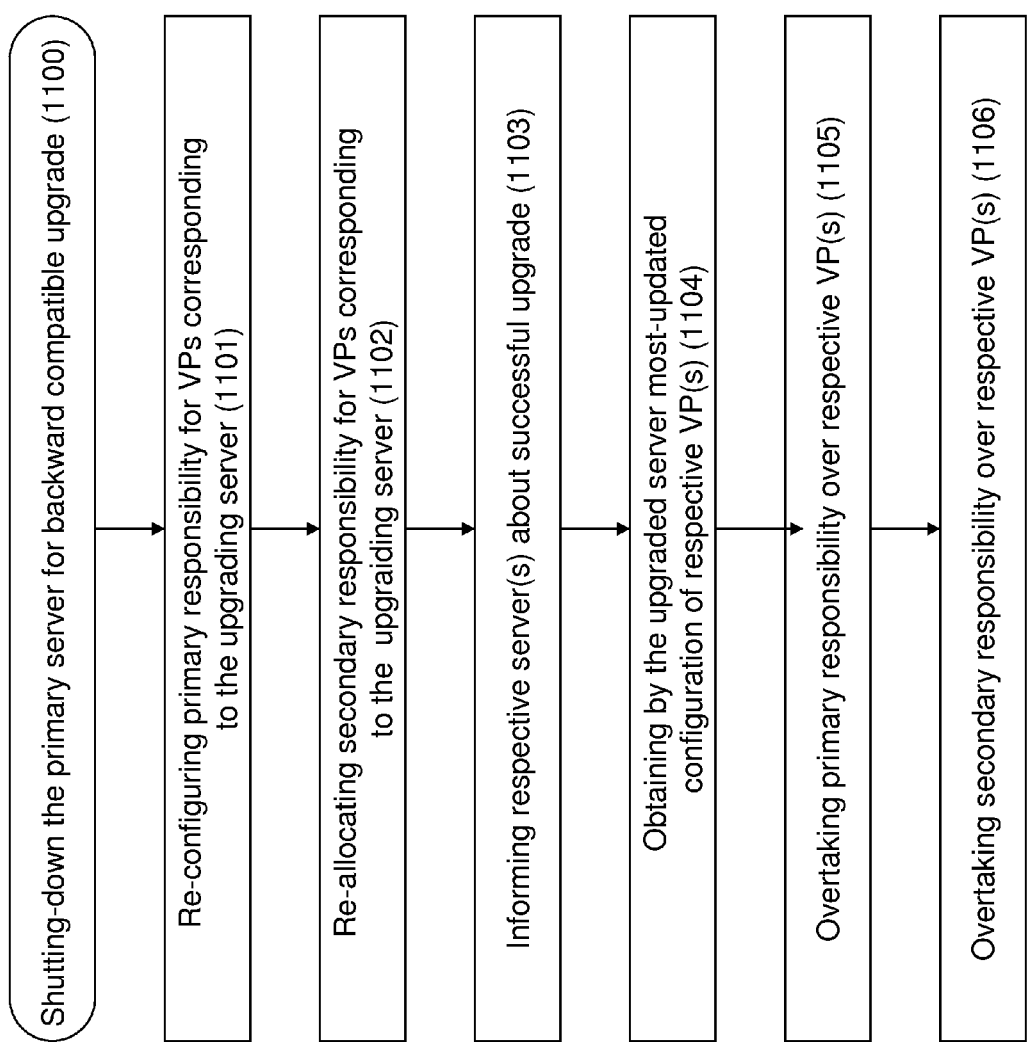
FIG. 11 illustrates a schematic flow-chart of a hot upgrade procedure in accordance with certain embodiments of the present invention.

Referring to FIG. 11, there is provided a schematic flowchart of the hot upgrade procedure. In accordance with certain embodiments of the present invention, the primary server may be shut-down for backward compatible upgrade without affecting the current operation of the storage system, thereby enabling hot upgrade of software, hardware and/or firmware of the storage system. In order to enable redundant operation of the storage system during the upgrade, the control grid is configured in a manner detailed with reference to FIG. 6. Responsive to shut-down of the primary server for upgrade purposes (1100), the primary responsibility over respective VPs is reconfigured (1101), and the secondary responsibility is re-allocated (1102) in a manner detailed with reference to FIG. 7. When the upgrade is successfully completed, the primary server informs (1103) the involved servers that it is in an operational condition. In a manner detailed with reference to FIG. 8, the primary server obtains (1104) the most updated configuration information, overtakes (1105) primary responsibility over respective VPs, and overtakes (1106) secondary responsibility over other respective VPs. Thus one of the servers may be taken down for upgrade, while the remaining servers will take over responsibility for I/O requests addressed to VPs assigned to this shut-down server, whilst enabling desired level of data protection.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A storage system comprising:
 a plurality of disk units adapted to store data at respective ranges of logical block addresses (LBAs), the LBAs constituting an entire address space, and
 a storage control grid operatively connected to the plurality of disk units and comprising a plurality of at least three data servers;
wherein each LBA in the entire address space is assigned to at least two data servers among the plurality of at least three data servers: a primary data server configured to have a primary responsibility for handling requests corresponding to said LBA, and a secondary data server configured to have a secondary responsibility for handling requests corresponding to said LBA and to take over the primary responsibility for handling requests corresponding to said LBA if the primary data server fails; and
wherein each data server is further configured, in response to a request corresponding to a certain LBA range under its primary responsibility, to identify a data server configured as a secondary data server with regard to the certain LBA range, to generate a primary cache object, and to enable generating a redundancy cache object corresponding to the primary cache object only at the identified secondary data server, the redundancy cache object to be used by the identified secondary data server, when taking the primary responsibility over the certain LBA range, for permanently storing respective data and/or metadata related to the certain LBA range.

2. The storage system of claim 1, wherein the request corresponding to the certain LBA range is selected from a group consisting of I/O requests and configuration-related requests.

3. The storage system of claim 1, wherein said redundancy cache object is derived from the primary cache object and needs to be reconstructed in order to enable taking over the primary responsibility.

4. The storage system of claim 1, wherein said redundancy cache object is further configured to be handled in a searchable data structure with no need to be incorporated into cache-object control procedures and/or dirty data destaging procedures of the secondary data server before the secondary data server takes over the primary responsibility.

5. The storage system of claim 1, wherein the redundancy cache object is derived from the primary cache object as a serialized version of the primary cache object.

6. The system of claim 1, wherein the redundancy cache object is derived from the primary cache object as a compressed version of the primary cache object.

7. A method of operating a storage system comprising a plurality of disk units adapted to store data at respective ranges of logical block addresses (LBAs), said addresses constituting an entire address space, and a storage control grid operatively connected to the plurality of disk units and comprising a plurality of at least three data servers, the method comprising:

configuring the entire address space so that each LBA is assigned to at least two data servers among the plurality of at least three data servers: a primary data server configured to have a primary responsibility for handling requests corresponding to said LBA, and a secondary data server configured to have a secondary responsibility for handling requests corresponding to said LBA and to take over the primary responsibility for handling requests corresponding to said LBA if the primary data server fails; and in response to a request corresponding to a certain LBA range,
 i) generating a primary cache object by a data server having primary responsibility over the certain LBA range;
 ii) identifying a data server configured as a secondary data server with regard to the certain LBA range; and
 iii) generating a redundancy cache object corresponding to the primary cache object only at the identified secondary data server, the redundancy cache object to be used by the identified secondary data server when taking the primary responsibility over the certain LBA range for permanent storing respective data and/or metadata related to the certain LBA range.

8. The method of claim 7 further comprising deleting the redundancy cache object upon successful permanent storing of data and/or metadata corresponding to the request, the successful permanent storing provided by the primary data server.

9. The method of claim 7 further comprising using the redundancy cache object by the secondary data server for providing permanent storing the data and/or metadata when overtaking primary responsibility.

10. The method of claim 7, wherein the redundancy cache object is derivation of the primary cache object, the method further comprising reconstructing, before using by the secondary data server, the redundancy cache object into a copy of the primary cache object.

11. The method of claim 10, wherein the reconstructing is provided responsive to a failure of the primary data server.

12. The method of claim 7, wherein the redundancy cache object is derived from the primary cache object as a serialized version of the primary cache object.

13. The method of claim 7, wherein the redundancy cache object is derived from the primary cache object as a compressed version of the primary cache object.

14. The method of claim 7 further comprising handling the redundancy cache object in a searchable data structure with no incorporation into cache-object control procedures and/or dirty data destaging procedures of the secondary data server before taking over the primary responsibility.

15. The method of claim 7, wherein the request corresponding to the certain LBA range is selected from a group consisting of I/O requests and configuration-related requests.

16. A computer program product for use in conjunction with a storage system comprising a plurality of disk units adapted to store data at respective ranges of logical block addresses (LBAs), said addresses constituting an entire address space, and a storage control grid operatively connected to the plurality of disk units and comprising a plurality of at least three data servers, the computer program product being embodied in a non-transitory computer readable storage medium and comprising computer readable instructions for:

configuring the entire address space so that each LBA is assigned to at least two data servers among the plurality of at least three data servers: a primary data server configured to have a primary responsibility for handling requests corresponding to said LBA, and a secondary data server configured to have a secondary responsibility for handling requests corresponding to said LBA and to take over the primary responsibility for handling requests corresponding to said LBA if the primary data server fails;

in response to a request corresponding to a certain LBA range, generating, by a data server having primary responsibility over the certain LBA range, a primary cache object;

identifying a data server configured as a secondary data server with regard to the certain LBA range; and generating a corresponding redundancy cache object only at the identified secondary data server, the redundancy cache object to be used by the identified secondary data server when taking the primary responsibility over the certain LBA range for permanent storing respective data and/or metadata related to the certain LBA range.

* * * * *